United States Patent
Sugaya

(10) Patent No.: US 7,359,398 B2
(45) Date of Patent: Apr. 15, 2008

(54) WIRELESS COMMUNICATION SYSTEM, WIRELESS COMMUNICATION DEVICE AND METHOD, AND COMPUTER PROGRAM

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 948 days.

(21) Appl. No.: 10/602,174

(22) Filed: Jun. 24, 2003

(65) Prior Publication Data

US 2004/0038684 A1    Feb. 26, 2004

(30) Foreign Application Priority Data

Jul. 1, 2002   (JP)   ............ P2002-192591

(51) Int. Cl.
*H04L 12/28* (2006.01)
*H04J 3/16* (2006.01)

(52) U.S. Cl. .............. 370/431; 455/452.2; 370/468
(58) Field of Classification Search ............... None
See application file for complete search history.

(56) References Cited

U.S. PATENT DOCUMENTS

| | | | |
|---|---|---|---|
| 4,736,371 A | | 4/1988 | Tejima et al. |
| 5,392,280 A | * | 2/1995 | Zheng ................. 370/353 |
| 5,570,355 A | * | 10/1996 | Dail et al. ............. 370/352 |
| 5,953,344 A | * | 9/1999 | Dail et al. ............. 370/443 |
| 6,151,651 A | * | 11/2000 | Hewitt et al. ......... 710/315 |
| 6,600,756 B1 | | 7/2003 | Haviland |
| 2002/0009055 A1 | | 1/2002 | Sugaya |

FOREIGN PATENT DOCUMENTS

| | | |
|---|---|---|
| JP | 62-199129 A | 9/1987 |
| JP | 2000-244535 A | 9/2000 |
| JP | 2001-24647 A | 1/2001 |
| JP | 2002-51059 A | 2/2002 |

* cited by examiner

*Primary Examiner*—Doris H. To
*Assistant Examiner*—Kerri M Rose
(74) *Attorney, Agent, or Firm*—Lerner, David, Littenberg, Krumholz & Mentlik, LLP

(57) ABSTRACT

A system for wireless communication having a region for asynchronous information transmission and a region for information transmission. The system uses channel time allocation for storing data in a data transmission buffer and initially transmitting information via asynchronous communication. When an amount of data stored in the buffer exceeds a predetermined value, the system transmits information via channel time allocation communication. The predetermined value is obtained by dividing overall bandwidth of the asynchronous information region by a number of wireless communication stations forming a network. When no data is stored in the buffer during channel time allocation, an allocated channel time is released.

4 Claims, 10 Drawing Sheets

FIG. 5

| BEACON HEADER 51 | HEADER CHECK 52 | DEVICE IDENTIFIER 53 | NETWORK SYNCHRONIZATION PARAMETER 54 | TRANSMIT POWER CONTROL 55 | CHANNEL TIME ALLOCATION ELEMENT 56 | FRAME CHECK 57 |

FIG. 6

| COMMAND HEADER 61 | HEADER CHECK 62 | CHANNEL TIME REQUEST BLOCK 63 | FRAME CHECK 64 |

WIRELESS COMMUNICATION SYSTEM, WIRELESS COMMUNICATION DEVICE AND METHOD, AND COMPUTER PROGRAM

BACKGROUND OF THE INVENTION

1. Field of the Invention

The present invention relates to a wireless communication system, wireless communication device and method, and computer program for mutual communication among a plurality of wireless stations, and particularly to a wireless communication system, wireless communication device and method, and computer program in which a network is constructed under the management of a specific control station.

More specifically, the present invention relates to a wireless communication system, wireless communication device and method, and computer program for wireless communication having both a region for asynchronous information transmission at arbitrary timing and a region for information transmission with channel time allocation, and particularly to a wireless communication system, wireless communication device and method, and computer program in which information is transmitted initially via asynchronous communication and then, if the information is not successfully transmitted via asynchronous communication, via channel time allocation communication.

2. Description of the Related Art

A plurality of computers are connected to construct a LAN (local area network) so that files and data can be shared or peripheral devices such as a printer can be shared and information can be exchanged by transferring e-mail or data content.

In the past, devices were typically connected to a LAN using lines such as optical fibers, coaxial cables, and twisted pair cables. Such LAN connections require cables to be installed, thus making it difficult to construct a network with ease and increasing the complexity of cable connections. After construction of a LAN, another difficulty occurs in that device mobility is restricted by the cable length. Accordingly, wireless LAN systems have become increasingly popular as a solution to the wiring problem with such traditional wired LAN systems. This type of wireless LAN system can remove most of the cables in working environments such as offices, thus allowing users to relatively easily move communication terminals such as personal computers (PCs).

With the advent of high-speed and low-cost wireless LAN systems in recent years, the demands for such wireless LAN systems have increased remarkably. Recently, in particular, studies on personal area network (PAN) systems have been made to construct a small-scale wireless network among a plurality of electronic devices around individuals for information communication. A variety of wireless communication systems using unlicensed frequency bands such as the 2.4-GHz band and the 5-GHz band are standardized.

For example, the IEEE 802.15.3 working group is standardizing the specification of high-speed (20 Mbps or greater) wireless personal area networks. In IEEE 802.15.3, standardization mainly focusing on a PHY layer using 2.4 GHz-band signals is being developed.

In this type of wireless personal network, a single wireless communication device operates as a control station called a "coordinator", and a personal area network with a range as short as approximately 10 m from this coordinator is formed. The coordinator sends beacon signals at predetermined intervals, and the intervals of the beacon signals are defined as transmission frame periods. For every transmission frame period, channel time is allocated to or reserved for each wireless communication device.

In one of the related art wireless communication methods, specific parameter information is exchanged prior to transmission, and then channel time used for the transmission is allocated or reserved, after which the communication starts. A well-known channel time allocation communication method is the BRAN (Broadband Radio Access Network) HiperLAN Type-2 wireless communication system, which is an European wireless local area network (LAN) standard.

Another related art wireless communication method is a method for information transmission at arbitrary timing without channel time allocation. A famous information transmission method without channel time allocation is the access control protocol for use in the wireless communication system of IEEE 802.11 wireless local area networks (LANs).

For example, when AV streaming is implemented as an upper-layer application, the wireless transmission channel is occupied for a long time and it is therefore effective to use the former wireless communication method, which enables the bandwidth to be reserved for a long time.

On the other hand, when asynchronous information exchange such as IP-packet-based transmission is implemented as an upper-layer application, it is effective to use the latter wireless communication method, which provides immediate transmission when the demand for transmission occurs.

A wireless communication system using both communication methods is represented by, for example, the high-speed wireless personal area network (PAN) communication protocol defined by the IEEE 802.15.3 standard. A MAC (medium access control) layer specified by IEEE 802.15.3 includes a contention access period (CAP) and a contention free period (CFP). During the CAP, asynchronous communication is performed to exchange short data or command information. For stream communication, on the other hand, dynamic time slot allocation is performed using a guaranteed time slot (GTS) in the CFP, thereby achieving channel time allocation communication.

In the IEEE 802.15.3 standard, the MAC layer is defined so as to be applicable as a standard specification of a PHY (physical) layer other than the PHY layer using 2.4 GHz band signals. According to the IEEE 802.15.3 standard, a PHY layer other than the PHY layer using the 2.4 GHz band signals is to be utilized.

Japanese Patent Application No. 2002-28128 assigned to the present assignee discloses a wireless communication method in which a part of the transmission bandwidth is used for channel time allocation communication while information transmission at arbitrary timing is performed in the remaining bandwidth. Specifically, a wireless communication device sets a management information announcement period at predetermined time intervals, and sends management information including reception timing information indicating its information reception start position, reception window information, and reception period information. A recipient wireless communication device which receives the management information stores the reception timing information, the reception window information, and the reception period information in association with the communication device number of the originating wireless communication device. For information transmission, based on the reception timing, reception window, and reception period information of a communication partner, the reception start position of the corresponding communication device is obtained to transmit information at this given timing. According to this wireless communication method, a wireless communication device announces its reception timing, reception window, and reception period information beforehand, and receives information in this given window. This eliminates the need for this wireless communication device to constantly wait, unlike the traditional method, thus reducing the power consumption for reception.

Japanese Patent Application No. 2002-57839 assigned to the present assignee discloses a wireless communication method in which information transmission is performed not at arbitrary timing, but at a reception timing predetermined for a specific communication device. Specifically, a control station specifies a given frame and assigns a unique access slot in this frame, for a period in which data is received, to each wireless communication device in this network to send a beacon signal including the assigned access slot. Each wireless communication device in the wireless network receives information during its unique access slot defined by the beacon signal. For transmission of information between communication devices in the network, a given communication device transmits the information using the access slot of the destination communication device. According to this wireless communication method, each wireless communication device receives information in the access slot assigned thereto based on the beacon signal. This method enables the information to be received in a simple manner, and also eliminates the need for the wireless communication devices in the network to constantly wait, thus reducing the power consumption of the devices. Furthermore, each wireless communication device which receives a beacon signal from the control station can easily determine the reception timing of the other wireless communication devices. Therefore, communication devices can synchronize access slot timing based on the beacon signals, thereby accomplishing timing synchronization within the network, thus making the reception process simple. For data transmission, a given wireless communication device transmits information to a destination device using the access slot of the destination device, thus achieving highly random-access asynchronous communication.

A communication sequence of the related art using channel time allocation, which includes exchanging channel time allocation parameters necessary for transmission according to an instruction from an upper layer such as an application layer and making a request according to the parameters, is employed as a channel time reservation method for isochronous transmission in wireless 1394 (ARIB-STD-T72).

In a wireless communication scheme using channel time allocation, channel time must be allocated according to a predetermined procedure before information transmission. One problem is that information cannot be transmitted until completion of channel time allocation.

In a wireless communication scheme for information transmission at arbitrary timing, all the communication devices forming a network must constantly wait because they cannot determine which communication device sends information at which timing.

In principle, a wireless communication protocol defining both the above-mentioned wireless communication schemes cannot determine which wireless communication scheme is to be used for information transmission unless the type of upper-layer application is identified.

If it cannot be determined immediately after a transmission demand whether or not this transmission was requested by an application that requires channel time allocation communication, information must be redundantly buffered and it must be determined, based on the amount of buffered information, whether or not the transmission was requested by an application that requires channel time allocation. Therefore, immediate wireless transmission is not achievable.

In the channel time allocation communication protocol, extra channel time allocation for a small amount of information transmission causes a great portion of traffic on the wireless transmission channel to be occupied by communication required for the channel time allocation, with the result that the throughput of the information transmission is reduced.

Furthermore, channel time allocation for a small amount of information which must be returned in a short time, such as response information at upper layers, can cause a delay in processing.

In a channel time allocation transmission sequence of the related art, channel time allocation parameters are specified according to an instruction from an upper layer such as an application layer to request channel time allocation according to the parameters. In such a sequence, a mechanism for exchanging the parameters beforehand must be defined.

Therefore, wireless communication cannot be closed and controlled using the wireless communication protocol alone.

SUMMARY OF THE INVENTION

In view of the aforementioned technical problems, it is an object of the present invention to provide a better wireless communication system, wireless communication device and method, and computer program for wireless communication having both a region for asynchronous information transmission at arbitrary timing and a region for information transmission using channel time allocation.

It is another object of the present invention to provide a better wireless communication system, wireless communication device and method, and computer program in which information can be transmitted initially via asynchronous communication and then, if the information is not successfully transmitted via asynchronous communication, via channel time allocation communication.

It is a still another object of the present invention to provide a better wireless communication system, wireless communication device and method, and computer program in which information can be transmitted initially via asynchronous communication and then, if the information is not successfully transmitted via asynchronous communication, via channel time allocation communication without identifying the type of upper-layer applications.

It is a still another object of the present invention to provide a better wireless communication system, wireless communication device and method, and computer program in which the channel time for channel time allocation communication can be released without reception of announcement of completion of channel time allocation communication from an upper-layer application.

Accordingly, in a first aspect of the present invention, a system for wireless communication having an asynchronous access region and a channel-time-allocation access region is configured such that information communication is initiated in the asynchronous access region and, in excess of a predetermined transmission capacity, channel time is allocated.

In a second aspect of the present invention, a system for wireless communication having an asynchronous access region and a channel-time-allocation access region is configured such that, below a predetermined transmission capacity during channel time allocation communication, channel time is released.

The term "system" means a logical set of devices (or function modules which perform specific functions), and does not particularly refer to whether or not the devices or function modules are accommodated in a single housing.

In the asynchronous access region, asynchronous wireless communication in contention access period (CAP) may be performed. In the channel-time-allocation access region, channel time allocation communication in a contention free period (CEP) may be performed.

The predetermined transmission capacity may be bandwidth obtained by dividing the overall bandwidth of the asynchronous access region by the number of communication devices forming a network.

According to the wireless communication system in the first aspect of the present invention, information can be transmitted from an originating communication device to a destination communication device immediately after the transmission starts, and, if necessary, channel time allocation communication can be performed.

According to the wireless communication system in the first aspect of the present invention, furthermore, in excess of a predetermined transmission capacity, a channel time allocation mechanism is applied, thus achieving higher-quality-of-service communication than asynchronous communication at every channel time.

According to the wireless communication system in the first aspect of the present invention, furthermore, information can be transmitted initially via asynchronous communication and then, if the information is not successfully transmitted via asynchronous communication, via channel time allocation communication, without identifying the type of upper-layer applications.

In this communication scheme, communication is initiated without channel time allocation prior to transmission, and the amount of information which can be transmitted via asynchronous communication is wirelessly transmitted without channel time allocation, thus eliminating extra channel time allocation for a small amount of information transmission. For example, for a small amount of streaming for a long time, channel time allocation is not performed unless in excess of a predetermined transmission capacity.

In this communication scheme, therefore, a process for channel time allocation is not performed, and traffic on the wireless transmission channel can be greatly improved.

Also in isochronous communication, information can be wirelessly transmitted without channel time allocation in communication up to a predetermined amount of information, thus removing extra channel time allocation to simplify mounted parts in the system.

By using asynchronous wireless communication, isochronous communication up to a predetermined transmission capacity has the same advantage as that of communication with bandwidth reservation.

According to the wireless communication system in the second aspect of the present invention, if channel time reservation is not required during channel time allocation transmission, the allocated channel time can be released so as to repeatedly use this channel time for other information transmission.

According to the wireless communication system in the second aspect of the present invention, furthermore, the channel time for channel time allocation communication can be released without reception of announcement of completion of channel time allocation communication from an upper-layer application.

In a third aspect of the present invention, a wireless communication device or method for performing frame-based channel time allocation within a wireless network in which wireless communication having an asynchronous access region and a channel-time-allocation access region is performed at a predetermined frame period between wireless communication devices includes a request receiving unit or step of receiving at least one of a channel time allocation request and a channel time release request from a wireless communication device in the wireless network; and a frame setting unit or step of setting the asynchronous access region and the channel-time-allocation access region in the frame period according to the received at least one of the channel time allocation request and the channel time release request.

According to the wireless communication device or method in the third aspect of the present invention, information can be transmitted initially via asynchronous information transmission, and, if necessary, channel time allocation communication can be performed during information transmission between the originating and destination devices.

According to the wireless communication device or method in the third aspect of the present invention, furthermore, a channel time allocation mechanism is applied during information transmission between the originating and destination devices in excess of a predetermined transmission capacity, thus achieving higher-quality-of-service communication than asynchronous communication at every channel time.

In a fourth aspect of the present invention, a wireless communication device operating in a wireless network in which wireless communication having an asynchronous access region and a channel-time-allocation access region is performed at a predetermined frame period under the management of a control station, or a wireless communication method of performing wireless communication having an asynchronous access region and a channel-time-allocation access region at a predetermined frame period under the management of a control station in a wireless network includes an asynchronous access control unit or step of transmitting information in the asynchronous access region; a channel time allocation communication control unit or step of transmitting information using channel time allocated in the channel-time-allocation access region; a transmission information storing unit or step of storing transmission information; a transmission capacity determining unit or step of determining the amount of information transmittable in the asynchronous access region; and a channel time request unit or step of sending a channel time allocation request or a channel time release request to the control station according to a result of comparison between the amount of information stored in the transmission information storing unit or step and the amount of information determined by the transmission capacity determining unit or step.

The transmission capacity determining unit or step may determine the amount of information transmittable in the asynchronous access region by dividing the overall bandwidth of the asynchronous access region by the number of wireless communication devices forming the wireless network.

The channel time request unit or step may send the channel time allocation request to the control station when the amount of information stored in the transmission information storing unit or step exceeds the amount of information determined by the transmission capacity determining unit or step during transmission of the information in the asynchronous access region performed by the asynchronous access control unit or step.

Alternatively, the channel time request unit or step may send the channel time release request to the control station when the amount of information stored in the transmission information storing unit or step is below the amount of information determined by the transmission capacity determining unit or step during transmission of the information in the channel-time-allocation access region performed by the channel time allocation communication control unit or step.

According to the wireless communication device or method in the fourth aspect of the present invention, therefore, information can be transmitted from an originating communication device to a destination communication device immediately after the transmission starts, and, if necessary, channel time allocation communication can be performed.

According to the wireless communication device or method in the fourth aspect of the present invention, furthermore, in excess of a predetermined transmission capacity, a channel time allocation mechanism is applied, thus achieving higher-quality-of-service communication than asynchronous communication at every channel time.

According to the wireless communication device or method in the fourth aspect of the present invention, furthermore, information can be transmitted initially via asynchronous communication and then, if the information is not successfully transmitted via asynchronous communication, via channel time allocation communication, without identifying the type of upper-layer applications.

In this communication scheme, communication is initiated without channel time allocation prior to transmission, and the amount of information which can be transmitted via asynchronous communication is wirelessly transmitted without channel time allocation, thus eliminating extra channel time allocation for a small amount of information transmission. For example, for a small amount of streaming for a long time, channel time allocation is not performed unless in excess of a predetermined transmission capacity.

In this communication scheme, therefore, a process for channel time allocation is not performed, and traffic on the wireless transmission channel can be greatly improved.

Also in isochronous communication, information can be wireless transmitted without channel time allocation in communication up to a predetermined amount of information, thus removing extra channel time allocation to simplify mounted parts in the system.

By using asynchronous wireless communication, isochronous communication up to a predetermined transmission capacity has the same advantage as that of communication with bandwidth reservation.

According to the wireless communication device or method in the fourth aspect of the present invention, furthermore, if channel time reservation is not required during channel time allocation transmission, the allocated channel time can be released so as to repeatedly use this channel time for other information transmission.

According to the wireless communication device or method in the fourth aspect of the present invention, furthermore, the channel time for channel time allocation communication can be released without reception of announcement of completion of channel time allocation communication from an upper-layer application.

In a fifth aspect of the present invention, a computer program described in a computer-readable format for executing on a computer system a frame-based channel time allocation process within a wireless network in which wireless communication having an asynchronous access region and a channel-time-allocation access region is performed at a predetermined frame period between wireless communication devices includes a request receiving step of receiving at least one of a channel time allocation request and a channel time release request from a wireless communication device in the wireless network; and a frame setting step of setting the asynchronous access region and the channel-time-allocation access region in the frame period according to the received at least one of the channel time allocation request and the channel time release request.

In a sixth aspect of the present invention, a computer program described in a computer-readable format for executing on a computer system a process for performing wireless communication having an asynchronous access region and a channel-time-allocation access region at a predetermined frame period under the management of a control station in a wireless network includes an asynchronous access control step of transmitting information in the asynchronous access region; a channel time allocation communication control step of transmitting information using channel time allocated in the channel-time-allocation access region; a transmission information storing step of storing transmission information; a transmission capacity determining step of determining the amount of information transmittable in the asynchronous access region; and a channel time request step of sending a channel time allocation request or a channel time release request to the control station according to a result of comparison between the amount of information stored in the transmission information storing step and the amount of information determined in the transmission capacity determining step.

The computer program in the fifth and sixth aspects of the present invention defines a computer program described in a computer-readable format for executing a predetermined process on a computer system. In other words, the computer program in the fifth and sixth aspects of the present invention is installed to a computer system, thereby exerting cooperation effects on the computer system to achieve similar advantages to those of the wireless communication device or method in the third and fourth aspects of the present invention.

Other objects, features, and advantages of the present invention will become apparent from the following detailed description of preferred embodiments of the present invention taken in conjunction with the drawings.

BRIEF DESCRIPTION OF THE DRAWINGS

FIG. 5 is a view schematically showing the structure of a beacon signal;

FIG. 6 is a view schematically showing the structure of a channel time allocation request signal;

DESCRIPTION OF THE PREFERRED EMBODIMENTS

An embodiment of the present invention is described in detail below with reference to the drawings.

Figure 1:
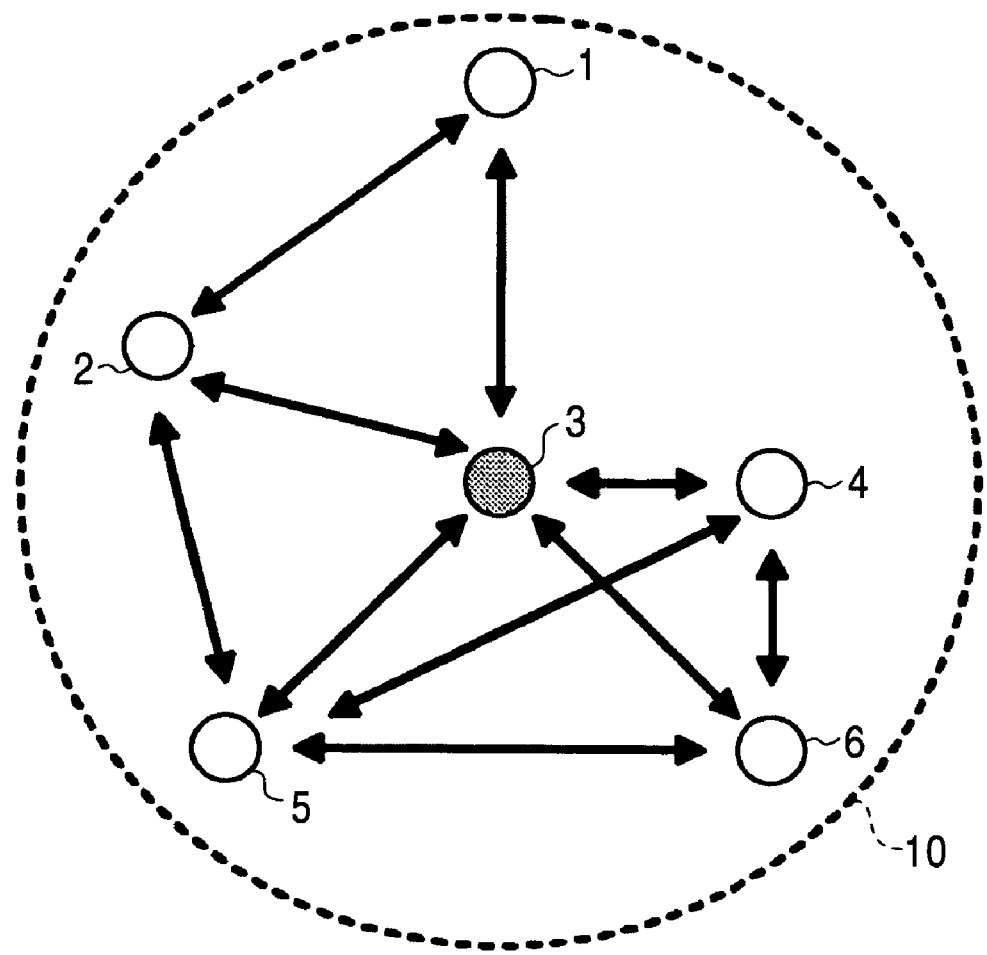
FIG. 1 is a schematic diagram of a small-scale wireless network according to an embodiment of the present invention.

FIG. 1 schematically illustrates the structure of a small-scale wireless network according to an embodiment of the present invention.

In FIG. 1, communication devices 1 through 6 form a wireless network. A bi-directional arrow indicates that information is exchangeable between communication devices which can directly communicate with each other. A given communication device and other communication devices located anywhere around a communication area of the given communication device may automatically form a wireless network.

In the example shown in FIG. 1, the communication device 3 serves as a control station having a communication area 10 as the coverage of a wireless network, and other communication devices are connected to this wireless network.

The communication device 1 can communicate with the communication devices 2 and 3; the communication device 2 can communicate with the communication devices 1, 3, and 5; the communication device 3 can communicate with all the communication devices 1, 2, 4, 5, and 6; the communication device 4 can communicate with the communication devices 3, 5, and 6; the communication device 5 can communicate with the communication devices 2, 3, 4, and 6; and the communication device 6 can communicate with the communication devices 3, 4, and 5.

Figure 2:
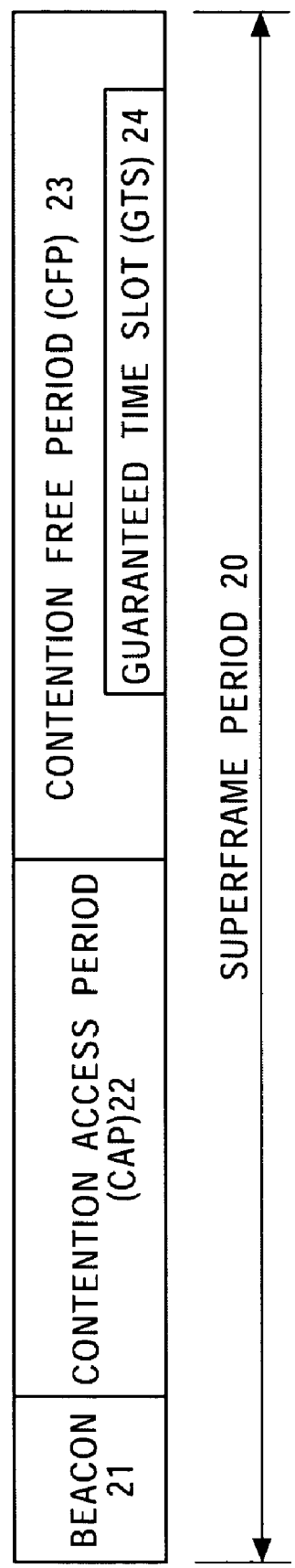
FIG. 2 is a view schematically showing a superframe period for use in an IEEE 802.15.3 personal area network.

FIG. 2 schematically shows the structure of a superframe period 20 for use in an IEEE 802.15.3 personal area network.

As shown in FIG. 2, a beacon 21 is located at the beginning of the superframe period 20 to define the superframe period 20.

Following the beacon 21, a contention access period (CAP) 22, which is a contention access region, and a contention free period (CFP) 23, which is a non-contention access region, are located.

In the CAP 22, asynchronous wireless communication using, for example, a CSMA/CA (Carrier Sense Multiple Access with Collision Avoidance) random access mechanism is performed. The CFP 23 includes reserved or allocated channel time called a guaranteed time slot (GTS) 24.

In an IEEE 802.15.3 personal area network, this superframe period is repeatedly used for management of the network.

Figure 3:
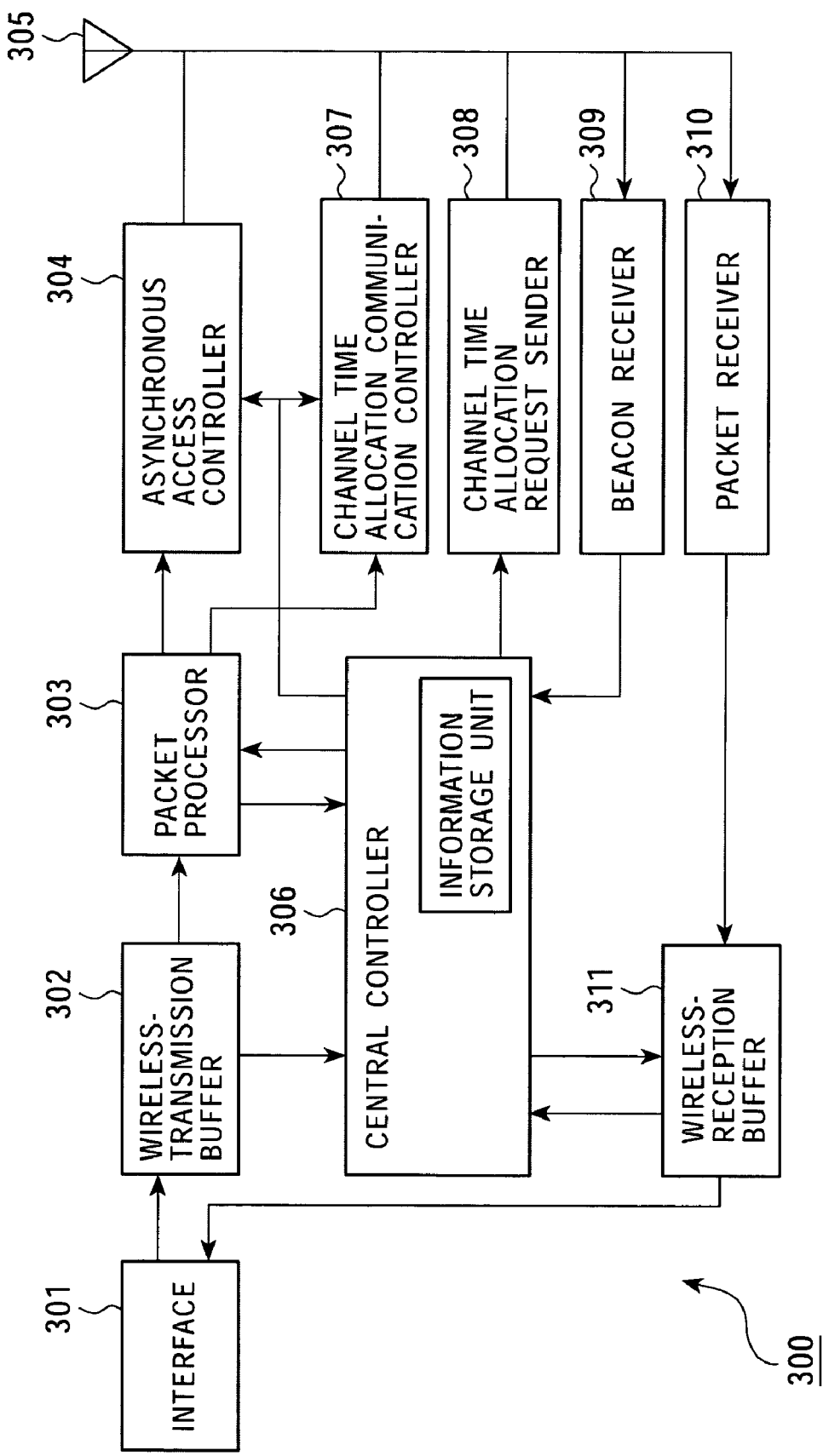
FIG. 3 is a block diagram schematically showing the functional structure of a wireless communication device 300 operating as a terminal station under the management of a control station in a wireless network according to the embodiment.

FIG. 3 schematically illustrates the functional structure of a wireless communication device 300 operating as a terminal station under the management of a control station of a wireless network according to the present embodiment. In the following description, in asynchronous wireless communication in a contention access period (CAP), transmission information id divided into packets each having a predetermined amount of information and the information is transmitted and received on a packet basis according to a predetermined access control method.

As shown in FIG. 3, the wireless communication device 300 includes an interface 301 through which the wireless communication device 300 is connected with various electronic devices; a wireless-transmission buffer 302 for temporarily storing wireless-transmission information; a packet processor 303 for dividing the wireless-transmission information into packets; an asynchronous access controller 304 for performing asynchronous communication; an antenna 305 for wirelessly transmitting the information from the access controller 304; a central controller 306 for controlling a series of operations in the communication device 300; a channel time allocation communication controller 307 for controlling channel time allocation communication; a channel time allocation request sender 308 for requesting channel time allocation communication; a beacon receiver 309 for receiving beacon information to obtain network management information or channel time allocation status information; a packet receiver 310 for receiving wirelessly transmitted information packets; and a wireless-reception buffer 311 for storing the received packets.

When the wireless communication device 300 transmits information, first, wireless-transmission information is received from various electronic devices connected thereto via the interface 301, and is stored in the wireless-transmission buffer 302. The stored information is divided into packets in predetermined transmission units by the packet processor 303. The packets are sent to the asynchronous access controller 304 to perform predetermined processing for asynchronous communication on a wireless transmission channel, and are then wirelessly transmitted from the antenna 305.

The asynchronous communication is performed by the asynchronous access controller 304 using, for example, the contention access period (CAP) in an IEEE 802.15.3 superframe.

When the wireless communication device 300 receives information, a signal received from the antenna 305 is processed by the packet receiver 310, and the information obtained as packets destined for the wireless communication device 300 is passed to the reception buffer 311.

The reception buffer 311 performs control such as re-transmission, if necessary, and, when all the required information is received, transfers the information to various electronic devices (not shown) connected with the communication device 300 via the interface 301.

The structure and operation of the wireless communication device 300 according to the present embodiment are characterized in that, when too much information to be processed in asynchronous communication is stored in the packet processor 303, a channel time allocation communication request is sent to the control station (described below) of the network from the channel time allocation request sender 308 under control of the central control station 306.

In response to this channel time allocation request, the control station allocates channel time for reservation. The allocated channel time is then announced by, for example, beacon information.

Beacon information is periodically sent from the control station. The beacon receiver 309 receives beacon information, and periodically supplies to the central controller 306 information indicating whether or not channel time is allocated.

Based on the channel time allocation information, if the requested channel time has been allocated, the central controller 306 sets the allocated channel time in the channel time allocation communication controller 307.

Then, the packets are supplied from the packet processor 303 to the channel time allocation communication controller 307, and are wirelessly transmitted at the allocated channel time from the channel time allocation communication controller 307 via the antenna 305.

The above-described series of operations is controlled by the central controller 306 according to a program (operational command procedure) stored in an internal information storage unit of the central controller 306.

In the foregoing description, the wireless communication device 300 is formed of discretely operating parts; however, processing of the wireless communication device 300 may be defined step-by-step according to the operational command procedure stored in the information storage unit.

Figure 4:
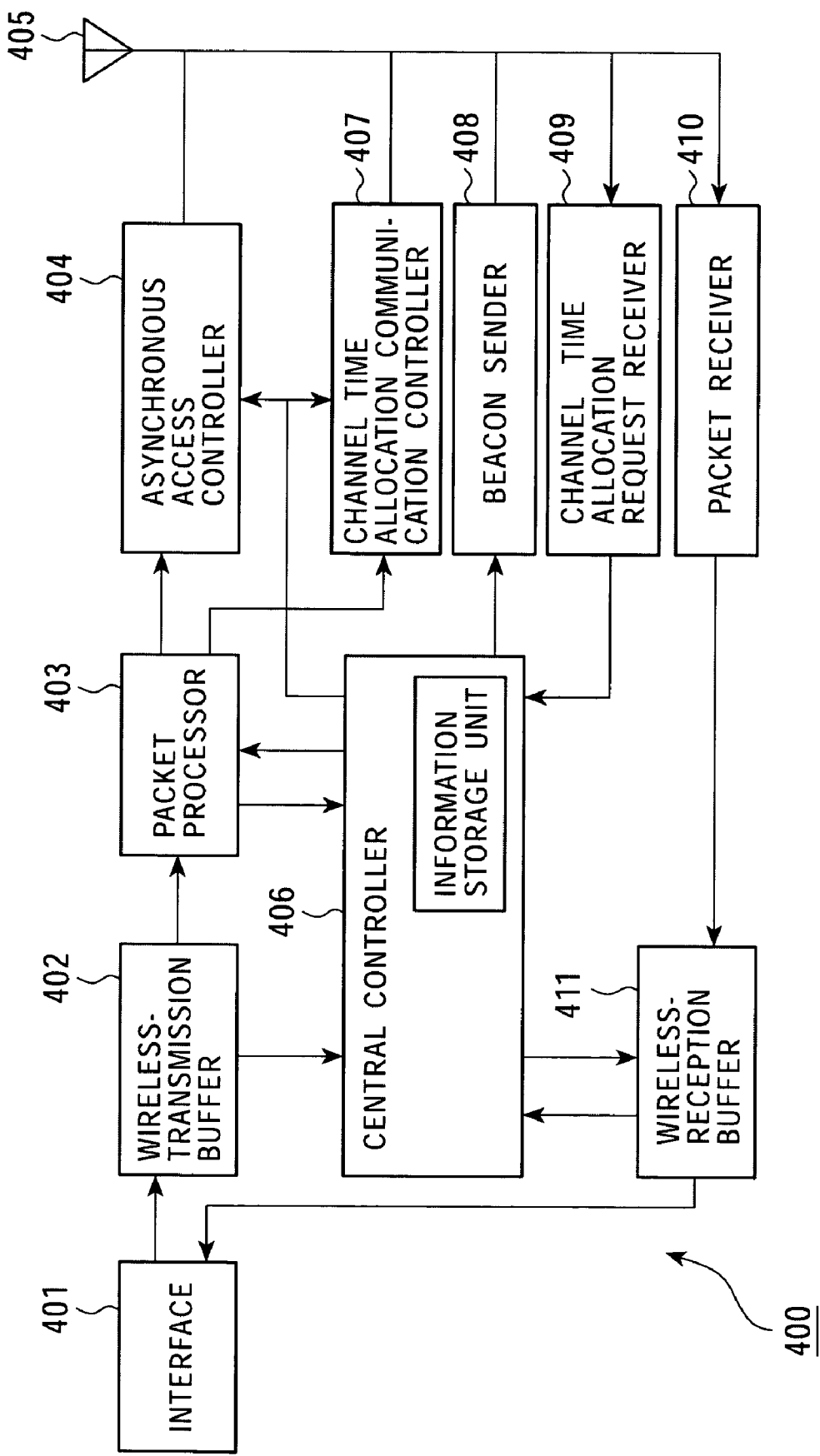
FIG. 4 is a block diagram schematically showing functional structure of a wireless communication device 400 operating as a control station in a wireless network according to the embodiment.

FIG. 4 schematically illustrates the functional structure of a wireless communication device 400 operating as a terminal station under the management of a control station in a wireless network according to the present embodiment. The wireless communication device 400 shown in FIG. 4 has a similar functional structure to the wireless communication device 300 shown in FIG. 3 operating as a terminal station, but functions as a control station in response to an instruction to operate as a control station.

As shown in FIG. 4, the wireless communication device 400 operating as a control station includes an interface 401 through which the wireless communication device 400 is connected with various electronic devices; a wireless-transmission buffer 402 for temporarily storing wireless-transmission information; a packet processor 403 for dividing the wireless-transmission information into packets; an asynchronous access controller 404 for performing asynchronous communication; an antenna 405 for wirelessly transmitting the information from the access controller 404; a central controller 406 for controlling a series of operations; a channel time allocation communication controller 407 for controlling channel time allocation communication; a channel time allocation request receiver 409 for receiving a channel time allocation request from another wireless communication device operating as a terminal station; a beacon sender 408 for sending beacon information containing network management information or channel time allocation status information; a packet receiver 410 for receiving wirelessly transmitted information packets; and a wireless-reception buffer 411 for storing the received packets.

A series of operations in the wireless communication device 400 is executed by the central controller 406 according to an operational command procedure (program) stored in an internal information storage unit of the central controller 406. Although the wireless communication device 400 is herein formed of discretely operating parts, processing of the wireless communication device 400 may be defined step-by-step according to the operational command procedure stored in the information storage unit.

FIG. 5 schematically shows the structure of a beacon signal sent from the wireless communication device 400 operating as a control station in a wireless network according to the present embodiment.

As shown in FIG. 5, a beacon frame signal is formed of header information (beacon header) 51 indicating a beacon signal, header check sequence (header check) 52 for checking whether or not the header information contains an error, device identification information (device identifier) 53 for identifying a device serving as a control station of the network, synchronization parameter information 54 necessary for network management, transmit power control 55 indicating the maximum transmission power level of the network, channel time allocation element 56 indicating information about channel time allocated in the contention free period (CFP), and frame check sequence (frame check) 57 for checking whether or not the frame information contains an error.

FIG. 6 schematically shows the structure of a channel time allocation request signal for requesting channel time sent to the control station 400 by the wireless communication device 300 operating as a terminal station in a wireless network according to the present embodiment.

As shown in FIG. 6, the command frame of the channel time allocation request signal is formed of header information (command header) 61 indicating a command for channel time allocation request, header check sequence (header check) 62 for checking whether or not the header information contains an error, channel time request block 63 indicating parameter information for channel time allocation request, and frame check sequence (frame check) 64 for checking whether or not the frame information contains an error.

Figure 7:
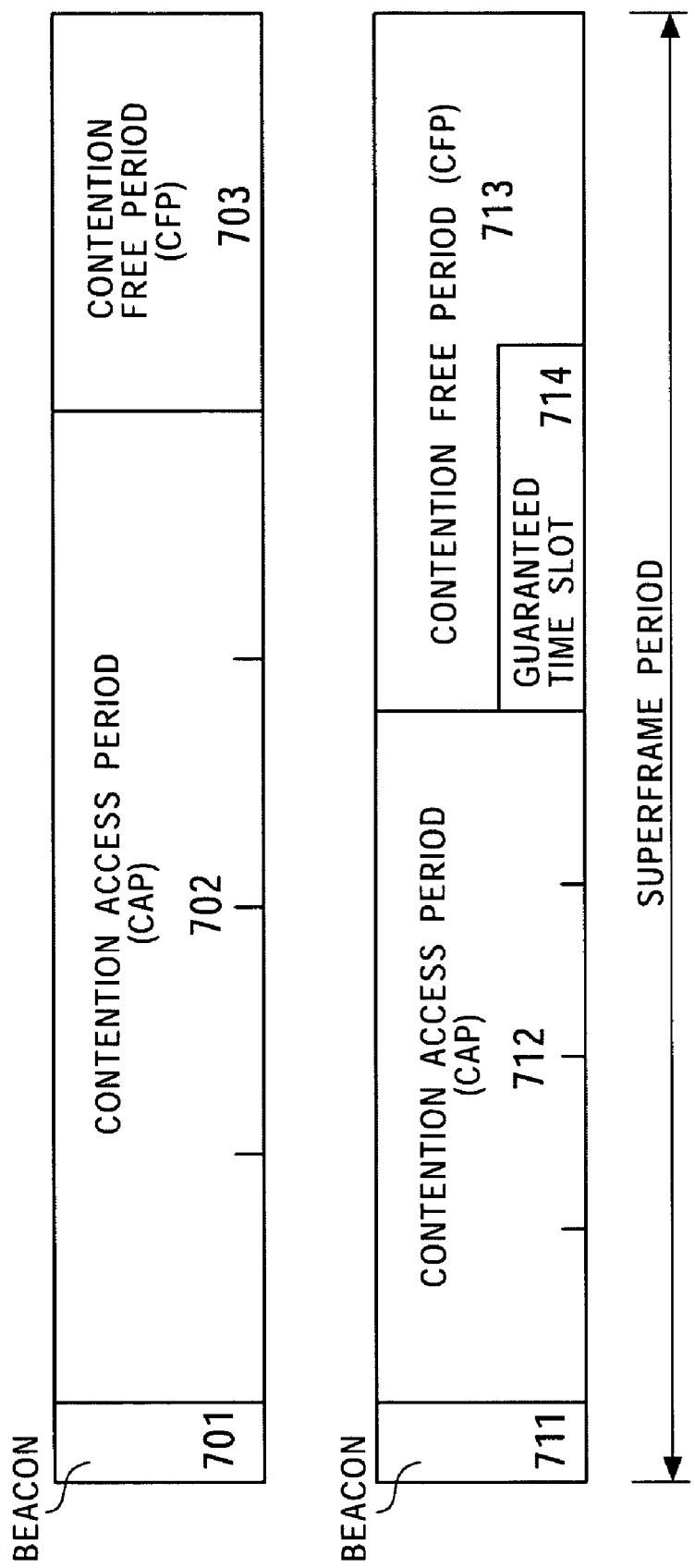
FIG. 7 is a view schematically showing how a superframe for use in a wireless network is modified.

FIG. 7 schematically shows how a superframe for use in a wireless network according to the present embodiment is modified in response to a channel time allocation request signal.

The superframe shown in the upper portion of FIG. 7 indicates no channel time allocation for given wireless communication, and is formed of a beacon 701 at the beginning thereof, followed by a contention access period (CAP) 702 and a contention free period (CFP) 703.

In the CAP 702, information is exchanged via asynchronous communication between wireless communication devices at arbitrary timing. Assuming that, for example, there are four wireless communication devices in a wireless network, then, desirably, the transmission capacity of each wireless communication device is bandwidth obtained by dividing the bandwidth of the CAP 702 by the number of communication devices forming the network; that is, the bandwidth is equal to or less than one quarter of the CAP bandwidth.

If information in excess of one quarter of the information transmittable in the CAP is stored in a buffer of one of the wireless communication devices, then a channel time allocation request process is initiated.

The superframe shown in the lower portion of FIG. 7 indicates channel time allocation for wireless communication in excess of a predetermined transmission capacity. The superframe is formed of a beacon 711 at the beginning thereof, followed by a contention access period (CAP) 712 and a contention free period (CFP) 713. The CFP 713 is allocated a guaranteed time slot 714 for given wireless communication. As a result, a greater portion of the superframe is occupied by the CFP 713.

In the CAP 712, as in the conventional way, channel time allocation request process may be initiated according to the number of wireless communication devices forming the network.

Figure 8:
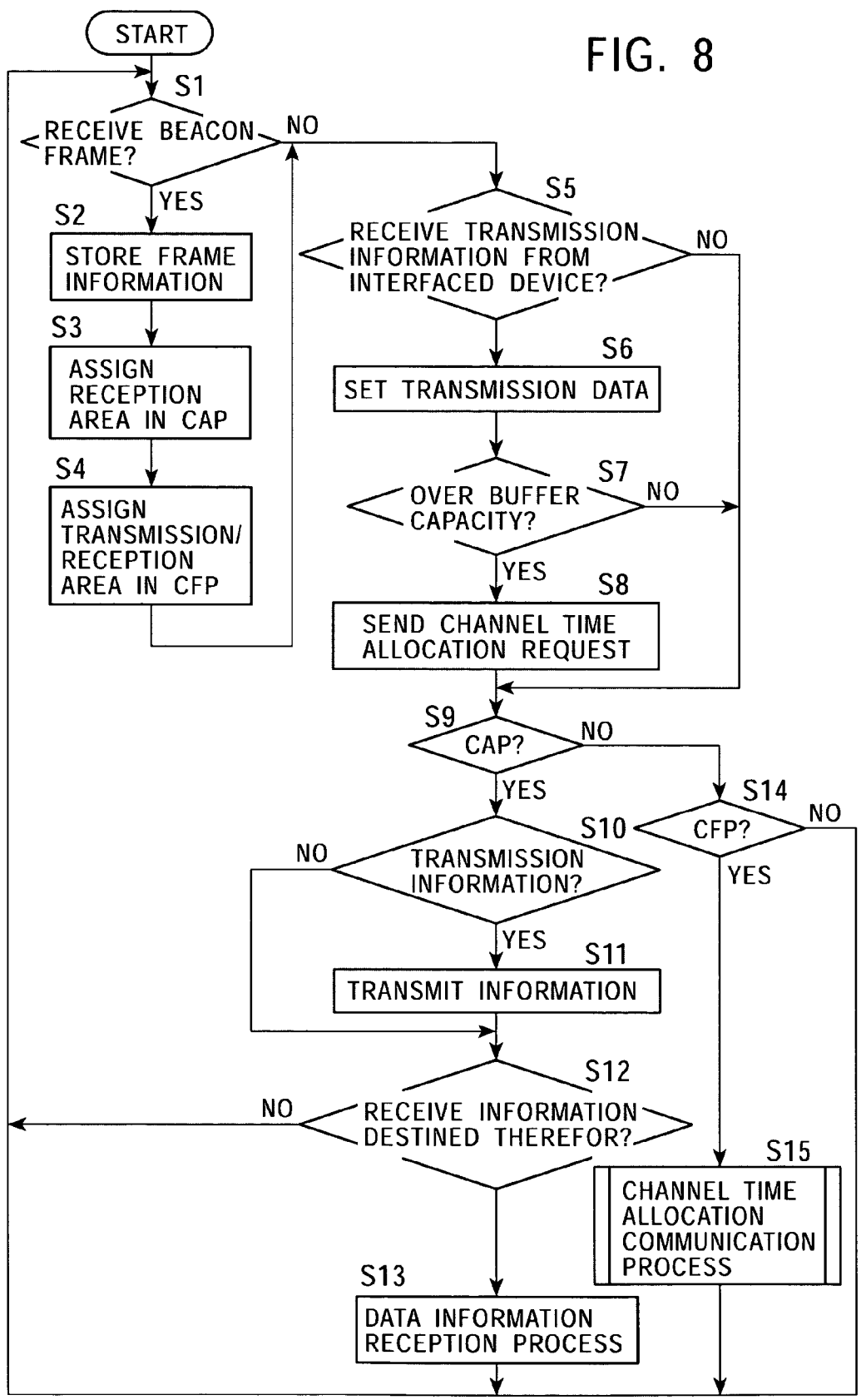
FIG. 8 is a flowchart illustrating the operation performed by the wireless communication device 300 operating as a typical terminal station in a wireless network according to the embodiment.

FIG. 8 is a flowchart illustrating a process executed by the wireless communication device 300 operating as a typical terminal station in a wireless network according to the present embodiment. This process is actually implemented by the central controller 306 executing program code stored in an internal information storage unit of the central controller 306. It is assumed herein that a predetermined association (participation) process has been already performed between wireless communication devices and the control station of the network.

First, based on the beacon of a superframe, the beacon receiver 309 is activated to receive a beacon signal from the control station of the network (step S1). If a beacon signal is received, information about the frame period is stored in an internal storage device (for example, the information storage unit of the central controller 306) (step S2).

Then, based on the received beacon information, a reception area in the contention access period is assigned (step S3), and a transmission/reception area in the contention free period is further assigned (step S4). Then, the process proceeds to step S5. If a beacon signal is not received in step S1, the process directly proceeds to step S5.

In step S5, it is determined whether or not transmission information has been received from a device interfaced with the wireless communication device 300. If transmission information has been received, the transmission data is set (step S6).

Then, it is determined whether or not the transmission data exceeds a predetermined buffer capacity (step S7), and channel time allocation is requested only when the transmission data exceeds the predetermined buffer capacity (step S8).

Then, it is determined whether or not it is the contention access period of the superframe (step S9). If it is the contention access period, it is further determined whether or not transmission data is present (step S10).

If transmission information such as a channel time allocation request or transmission data is present, the information is transmitted according to a predetermined access control method (step S11), and then the process proceeds to step S12.

In step S12, a data reception process is performed when no transmission data is present and when the information transmission is not performed, and it is determined whether or not information destined for the wireless communication device 300 has been received.

If information destined for the wireless communication device 300 has been received, a reception process of the data information is performed (step S13). Specifically, when all the required data is received, the data information is transferred to a device connected via the interface 301. Then, the process returns to step S1 to repeat the above-noted series of operations.

If it is determined in the determination block S9 that it is not the contention access period, the NO branch is taken and it is further determined in step S14 whether or not it is the contention free period.

If it is the contention free period, a sub-routine process for channel time allocation communication is performed (step S15). If it is not the contention free period or when the sub-routine process for channel time allocation communication ends, the process returns to step S1 to repeat the above-noted series of operations.

Figure 9:
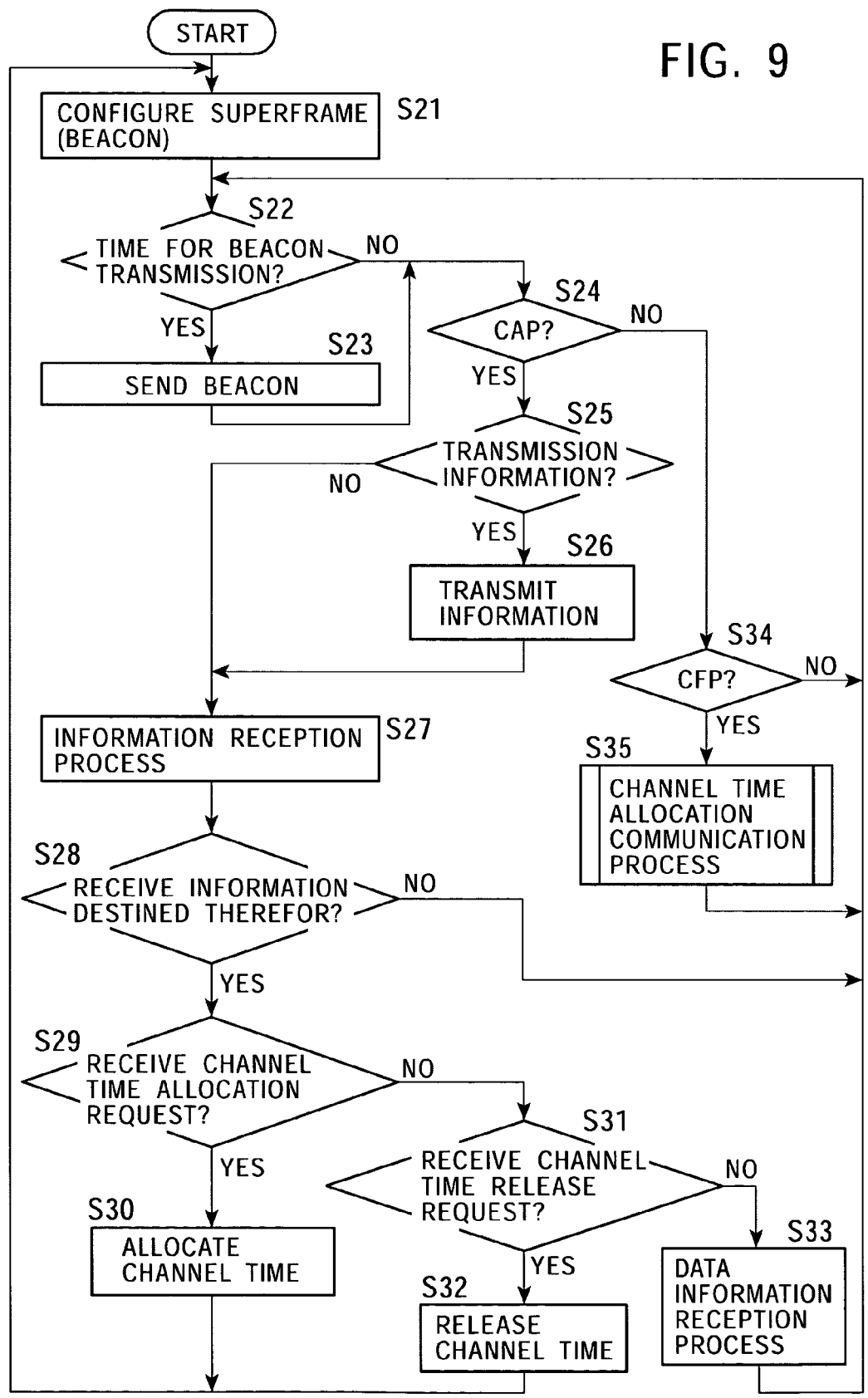
FIG. 9 is a flowchart illustrating the operation performed by the wireless communication device 400 operating as a control station in a wireless network according to the embodiment.

FIG. 9 is a flowchart illustrating a process executed by the wireless communication device 400 operating as a control station in a wireless network according to the present embodiment. This process is actually implemented by the central controller 406 executing program code stored in an internal information storage unit of the central controller 406. It is assumed herein that a predetermined association (participation) process has been already performed between wireless communication devices and the control station of the network.

The wireless communication device 400 serving as a control station configures a superframe period formed of a contention access period, a contention free period, etc., for management of the wireless network, and registers the superframe as beacon information (step S21).

It is determined whether or not it is time to transmit a beacon signal (step S22). If it is time to transmit, a beacon signal is sent from the beacon sender 408 (step S23), and the process proceeds to step S24. If it is not time to transmit, the process directly proceeds to step S24.

In step S24, it is determined whether or not it is the contention access period. If it is the contention access period, it is determined whether or not transmission data is present (step S25).

If transmission information such as transmission data is present, the information is transmitted according to a predetermined access control method (step S26), and then the process proceeds to step S27. If such transmission data is not present, the process directly proceeds to step S27.

In step S27, a data reception process is performed when no transmission data is present or when information transmission is not performed. In step S28, it is determined whether or not information destined for the wireless communication device 400 has been received.

If information destined for the wireless communication device 400 has been received, it is determined whether or not a channel time allocation request has also been received (step S29).

If a channel time allocation request has been received, channel time for communication is allocated (step S30), and the process returns to step S21 to change the superframe so as to reflect this allocation and to reflect this allocation in the beacon information.

If it is determined in the determination block S29 that a channel time allocation request has not been received, it is further determined whether or not a channel time release request has been received (step S31).

If a channel time release request has been received, the channel time for communication is released (step S32), and the process returns to step S21 to change the superframe so as to reflect this channel time release and to reflect this channel time release in the beacon information.

If it is determined in the determination block S31 that a channel time release request has not been received either, a data information reception process is performed (step S33). Specifically, when all the required data is received, the data information is transferred to a device connected via the interface 401.

If it is determined in the determination block S24 that it is not the contention access period, the NO branch is taken and it is further determined in step S34 whether or not it is the contention free period.

If it is determined that it is the contention free period, a sub-routine process for channel time allocation communication is performed (step S35).

If it is determined that it is not the contention free period or when the sub-routine process for channel time allocation communication ends, the process returns to step S22 to repeat the above-noted series of operations.

Figure 10:
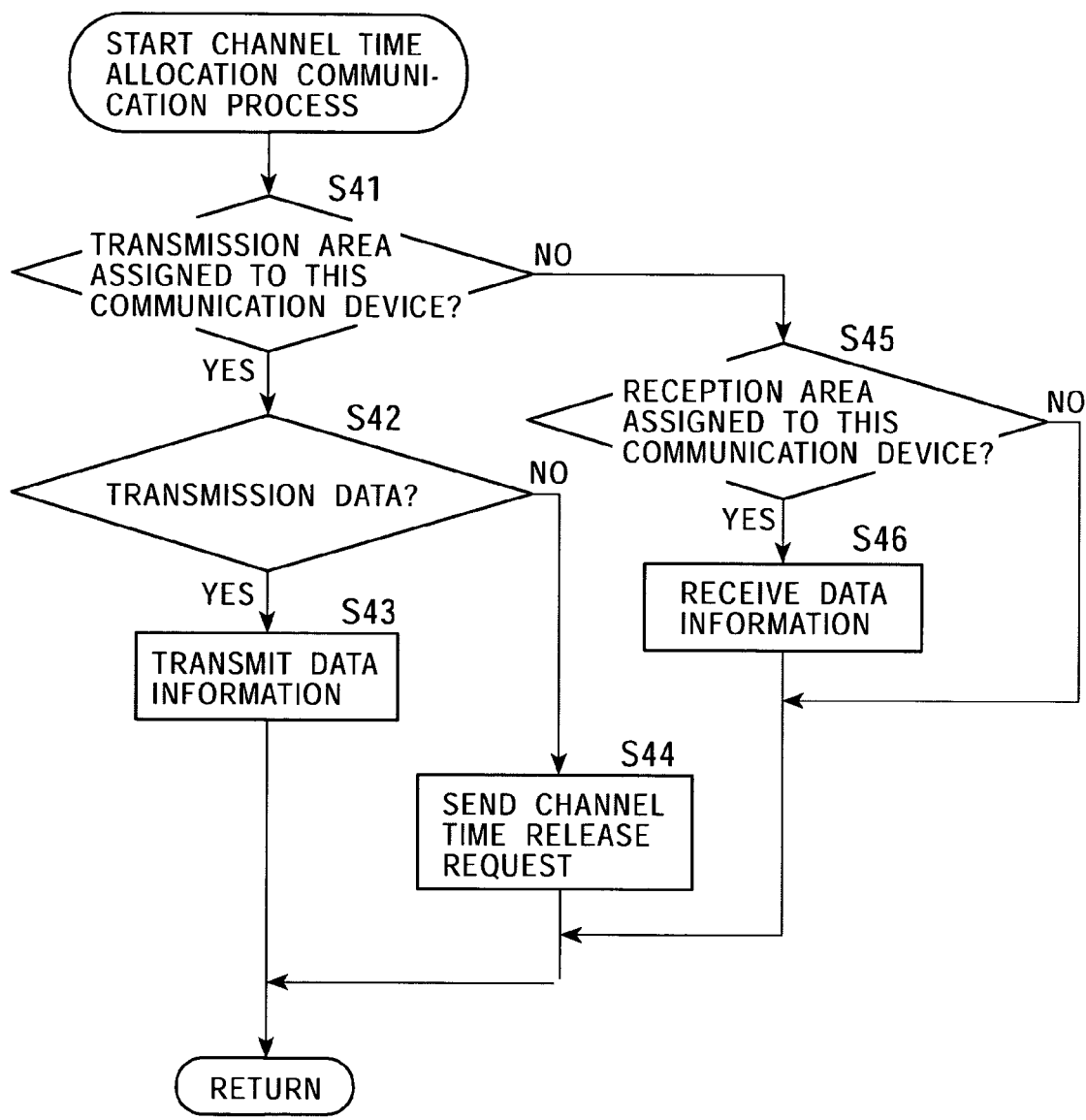
FIG. 10 is a flowchart illustrating a sub-routine process for channel time allocation communication.

FIG. 10 is a flowchart illustrating in detail the sub-routine process for channel time allocation communication (step S15 of FIG. 8) executed by the wireless communication device 300 operating as a typical terminal station, and the sub-routine process for channel time allocation communication (step S35 of FIG. 9) executed by the wireless communication device 400 operating as a control station.

First, it is determined whether or not it is the transmission area assigned to the wireless communication device 300 or 400 (step S41).

If it is the assigned transmission area, then, in step S42, it is determined whether or not transmission data is present.

If transmission data is present, the channel time allocation communication controller 307 or 407 of the wireless communication device 300 or 400 is activated to transmit the data information (step S43), and then this sub-routine process ends.

If no transmission data is present, a channel time release request is sent to the wireless communication device 400 serving as a control station (step S44), and then the sub-routine process ends.

If it is determined in the determination block S41 that it is not the assigned transmission area, then, in step S45, it is determined whether or not it is the reception area assigned to the wireless communication device 300 or 400.

If it is the assigned reception area, the channel time allocation communication processor of the wireless communication device 300 or 400 is activated to receive data information (step S46), and the sub-routine process ends. If it is not the assigned reception area, the sub-routine process ends.

While the present invention has been described in detail with reference to a specific embodiment, it is to be understood that modifications or variations may be made to the embodiment by a person skilled in the art without departing from the scope of the present invention. The above-described embodiment is merely an example, and should not be construed as a restricted form. The scope of the present invention is to be determined solely by the appended claims.

What is claimed is:

1. A wireless communication method of performing wireless communication of information using a transmission frame having an asynchronous access region in a contention access period and a channel-time-allocation access region in a contention free period, the method being under management of a control station in a wireless network, said wireless communication method comprising:
    transmitting information in the asynchronous access region of the contention access period of the transmission frame;
    determining an amount of information transmittable in the asynchronous access region during said transmission frame;
    sending a channel time allocation request to the control station according to a result of said step of determining; and
    transmitting at least a portion of the information using channel time allocated in the channel-time-allocation access region during said transmission frame,
    wherein said step of transmitting information using channel time further comprises allocating a guaranteed time slot to transmit a remaining information not transmittable in said asynchronous access region of the transmission frame, and
    wherein said step of allocating is performed without receiving an announcement of completion of channel time allocation communication from an upper-layer application.

2. A wireless communication device for performing wireless communication of information using a transmission frame having an asynchronous access region in a contention access period and a channel-time-allocation access region in a contention free period under management of a control station in a wireless network, said wireless communication device comprising:
    means for transmitting information in the asynchronous access region of the contention access period of the transmission frame;
    means for determining an amount of information transmittable in the asynchronous access region during said transmission frame;
    means for sending a channel time allocation request to the control station according to a result from said means for determining; and
    means for transmitting at least a portion of the information using channel time allocated in the channel-time-allocation access region during said transmission frame,
    said means for transmitting information using channel time comprises means for allocating a guaranteed time slot to transmit remaining information not transmittable in said asynchronous access region of the transmission frame without receiving an announcement of completion of channel time allocation communication from an upper-layer application.

3. A wireless communication device for performing wireless communication of information using a transmission frame having an asynchronous access region in a contention access period and a channel-time-allocation access region in a contention free period under management of a control station in a wireless network, said wireless communication device comprising:
    a transmitting unit operable to transmit information in the asynchronous access region of the contention access period of the transmission frame;
    a determining unit operable to determine an amount of information transmittable in the asynchronous access region during said transmission frame;
    a sending unit operable to send a channel time allocation request to the control station according to a result from said determining unit; and
    a transmitting unit operable to transmit at least a portion of the information using channel time allocated in the channel-time-allocation access region during said transmission frame,
    said transmitting unit operable to transmit information using channel time comprising an allocating unit operable to allocate a guaranteed time slot to transmit remaining information not transmittable in said asynchronous access region of the transmission frame without receiving an announcement of completion of channel time allocation communication from an upper-layer application.

4. A computer readable medium having stored thereon a computer program configured to be executable by a computer, the program being operable to execute a wireless communication method of performing wireless communication of information using a transmission frame having an asynchronous access region in a contention access period and a channel-time-allocation access region in a contention free period, the method being under management of a control station in a wireless network, said wireless communication method comprising:
    transmitting information in the asynchronous access region of the contention access period of the transmission frame;

determining an amount of information transmittable in the asynchronous access region during said transmission frame;

sending a channel time allocation request to the control station according to a result of said step of determining; and transmitting at least a portion of the information using channel time allocated in the channel-time-allocation access region during said transmission frame, wherein said step of transmitting information using channel time further comprises allocating a guaranteed time slot to transmit a remaining information not transmittable in said asynchronous access region of the transmission frame, and wherein said step of allocating is performed without receiving an announcement of completion of channel time allocation communication from an upper-layer application.

* * * * *